July 16, 1968  J. A. JOHNS  3,392,613
PUNCHING MACHINE
Filed Oct. 23, 1965  2 Sheets-Sheet 1
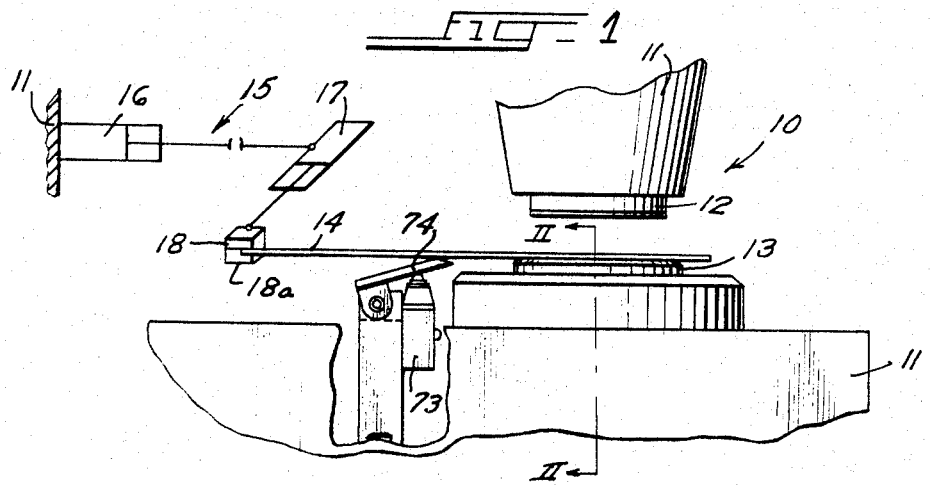
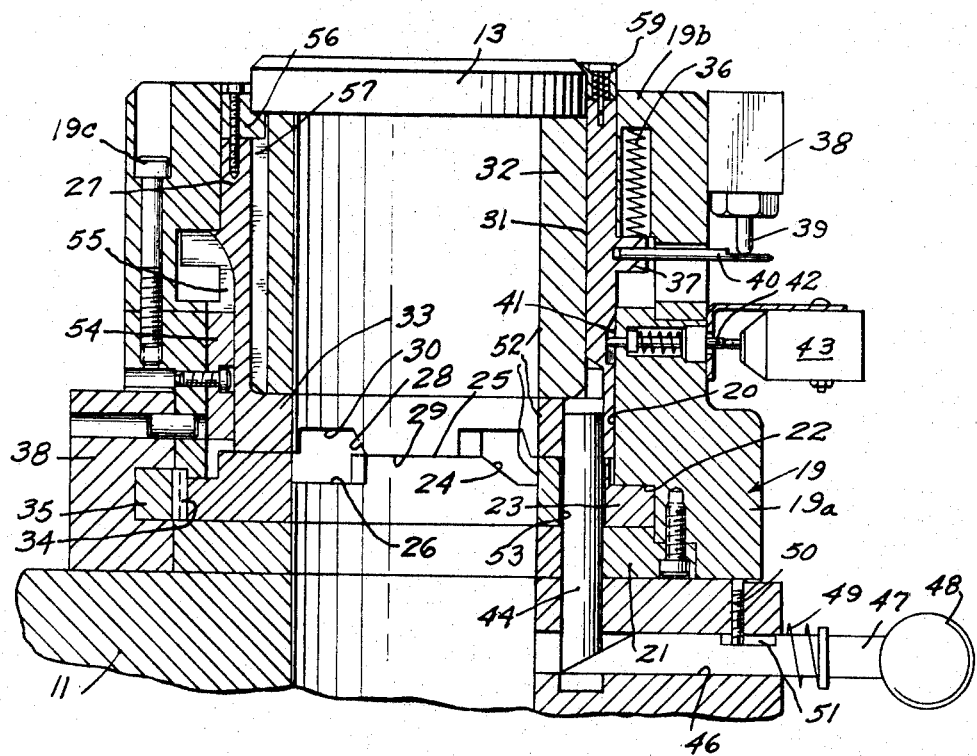
INVENTOR.
John A. Johns INVENTOR.
John A. Johns United States Patent Office
3,392,613
Patented July 16, 1968

3,392,613
PUNCHING MACHINE
John A. Johns, Kenmore, N.Y., assignor to Houdaille Industries, Inc., Buffalo, N.Y., a corporation of Michigan
Filed Oct. 23, 1965, Ser. No. 503,414
12 Claims. (Cl. 83—62)

ABSTRACT OF THE DISCLOSURE

The normally stationary die of a punching machine is supported by a tool retainer carried on a cam structure, the position of such cam determining the height of the die. An actuator-driven rack positions the cam structure and is under the control of a switch that is responsive to the approach of a workpiece positioning mechanism or its imminent collision with the die.

This invention relates generally to a punching machine, and more specifically to a structure embodied therein for altering the vertical position of the lower tool.

Although the principles of the present invention may be included in various punching machines, a particularly useful application is made in a machine of the type which includes a powered workpiece positioning mechanism. Such workpiece positioning mechanisms are controlled by a remote means, for example a push button keyboard, or a numerical tape control. Such workpiece positioning mechanisms grip the workpieces and move them about to various positions with respect to the punching axis of the machine. The workpiece to be punched is so moved that its lower surface is immediately adjacent to the upper surface of the lower tool or die. Thus, it is possible for the clamp that holds the workpiece, and which projects below such workpiece, to be forcibly driven against the lower tool in the event that workpiece movements are either manually or automatically improperly programmed. Heretofore, it has been necessary to program workpiece movements as separate segments or movements to avoid such possibility of interference. To illustrate this point more fully, if the workpiece is initially in a position where the workpiece holding clamp is at one side of the punching axis, and then the workpiece is to be programmed to a position where the workpiece-holding clamp is at the other side of the punching axis, it has been necessary to give a first command which moves the clamps to a position well to the rear of the punching axis, followed by a lateral move, followed by a forward move. But for this interference, it would be possible to program workpiece movements so that any clamp could pass directly through the space occupied by the upper end of the lower tool.

The present invention utilizes a special structure by which the lower tool is supported, such structure being operative to retract or lower the lower tool, either by direct programming of such a retraction, or by constructing the lower tool support means to include means that are responsive to an impending collision between the workpiece clamp and the lower tool for lowering such lower tool.

Accordingly, it is an object of the present invention to provide a novel punching machine.

A further object of the present invention is to provide tool support structure for the lower tool of a punching machine which enables the lower tool to be lowered and raised and yet adequately supported for punching.

Yet another object of the present invention is to provide a die retraction system for a punching machine.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a fragmentary side-elevational view of a punching machine, including a schematic diagram of a workpiece-positioning system forming a part of such machine;

FIG. 2 is an enlarged cross-sectional view taken along line II—II of FIG. 1;

As shown on the drawings:

Figure 3:
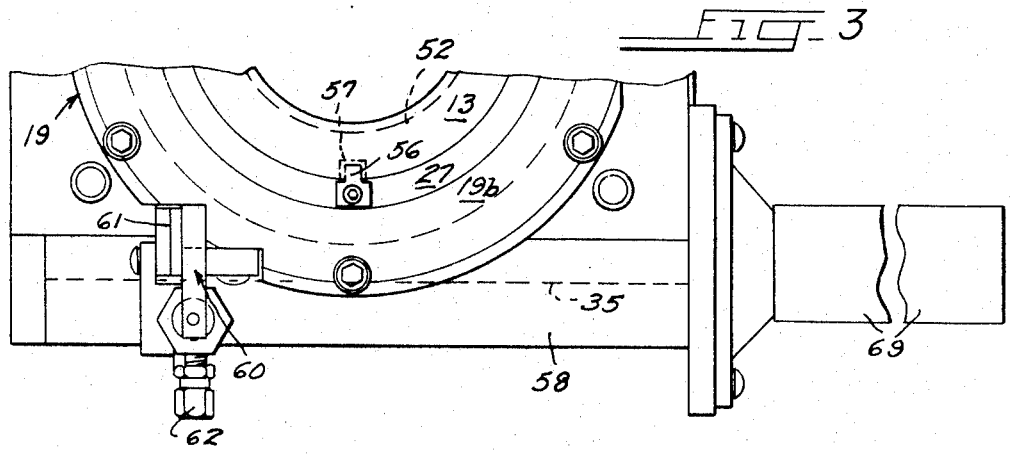
FIG. 3 is a fragmentary top view of the structure of FIG. 2.

The principles of this invention are particularly useful when embodied in a punching machine such as fragmentarily illustrated in FIG. 1, generally indicated by the numeral 10. The punching machine includes a stationary frame 11 which provides support for the various portions of the machine 10. The frame 11 supports an upper reciprocable driven tool 12, here illustrated as being a punch, and also supports a lower normally stationary tool 13, here illustrated as being an annular die. The punch 12 coacts with the die 13 in performing punching operations on a workpiece 14, such as a sheet of sheet metal or plastic. The lower side of the workpiece 14 lies substantially in the plane of the upper surface of the lower tool or die 13, and the workpiece 14 is moved about by a workpiece positioner 15 carried by the frame 11. The workpiece positioner system 15 includes actuator means 16 which move the workpiece 14 in the Y-axis, and actuator means 17 which move the workpiece 14 in the X-axis. The actuator 17 has a clamp portion or workpiece clamp 18 that engages opposite sides of the workpiece 14, the lower portion 18a of the clamp 18 projecting downwardly from the lower side of the workpiece 14 so that interference between such lower portion 18a and the lower tool 13 is possible.

To avoid such interference, a structure is provided such as shown in FIG. 2 for supporting the lower tool or die 13. A cylindrical housing 19 is secured to the frame 11 beneath the upper driven tool 12, and functionally is a part of the frame 11. The cylindrical housing 19 has a central stepped bore 20, at the lower end of which there is fixedly secured a hardened wearplate 21. Trapped between the wearplate 21 and a downwardly facing shoulder 22 within the cylindrical housing 19 is a movable wedge member 23, the member 23 being in the form of an annular rotatable cam which has a number of upwardly directed cam surfaces 24, a number of upper support surfaces 25, and a number of lower support surfaces 26. Within the bore 20 of the cylindrical housing 19 there is also disposed a vertically slidable tool retainer 27 constructed in generally tubular fashion, and having downwardly directed cam surface means 28, a lower support surface 29 and an upper support surface means 30. The vertically slidable tool retainer has a bore 31 within which a vertically slidable tool support 32 is disposed. The lower end of the tool retainer 27 has a flange 33 which projects beneath the lower end of the tool support 32 to support the same. The lower tool or die 13 rests directly on the upper end of the tool support 32.

The position of the parts illustrated in FIG. 2 is referred to herein as a normal or stationary position, particularly of the slidable tool retainer 27. In this position, the cam surface means 29 of the tool retainer 27 are supported by the cam surface means 25 of the movable wedge member 23. Thus there is provided a non-yielding stack of elements between the lower tool 13 and the frame 11 including the tool support 32 resting on the flange 33 which is supported in its uppermost position on the wedge member 23, which in turn is supported by the wearplate 21 resting on the frame 11. Such structure provides a solid backup or support for the lower tool 13.

The movable annular wedge member or cam 23 has a number of gear teeth 34 at its periphery which mesh with the teeth of a reciprocable rack 35 which is guided by the frame 11 for reciprocation. When the rack 35 is moved toward the viewer, the annular cam 23 is rotated in a counterclockwise direction as viewed from above. As such rotation or movement continues, the cam surface or surfaces 28 engage with the cam surfaces 24 to enable the tool retainer 27 to retract or to slide downwardly until the lower support surfaces 29 engage the surfaces 26, or until the upper surfaces 25 on the cam 23 are engaged by the downwardly directed surfaces 30 of the tool retainer 27. Such downward movement of the tool retainer 27 is assured by a plurality of compression springs 36 which act between the cylindrical housing 19 and a flange 37 on the outside of the tool retainer 27. The cylindrical housing 19 is made in two sections, 19a, and 19b, one of which is undercut to receive the flange 37 after the springs 36 are installed, and which housing sections 19a and 19b are held together by a number of screws 19c.

The cylindrical housing 19 supports a switch 38 which has a plunger 39 which engages a pin 40 carried by the flange 37. The switch 38 is of the normally open type and is held closed so long as the tool retainer 27 is in its fully upward or extended position. The movement of the upper or driven tool 12 is under the control of a punching control circuit of which the switch 38 is a part. When the switch 38 is open, movement of the upper driven tool 12 is disabled.

The compression springs 36 thus bias or urge the tool retainer 27 against the wedge member or rotatable cam 23, and when the wedge member 23 is positioned to enable the tool retainer 27 to retract or to move downwardly, an auxiliary cam surface 41 on the tool retainer 27 urges a spring-biased pin 42 outwardly which opens a normally closed switch 43, such switch also being referred to herein as a third switch. The function of the switch 43 is explained below.

When the rack 35 is moved in the opposite direction, the wedge member 23 restores the tool retainer 27 to its upper normal or stationary position as illustrated. Such movement stores energy in the springs 36, closes the switch 38, and opens the switch 43.

It is preferable that the tool support 32 be separate from the tool retainer 27 so that it may be also employed as part of means for ejecting the lower tool or die 13. To this end, there is provided a vertically reciprocable tool ejector pin 44 which is engageable with the lower end of the tool support 32 to move the tool support 32 upwardly independently of the tool retainer 27, thereby elevating the tool 13 to facilitate grasping thereof. Such upward movement of the ejector pin 44 may be provided in various ways. Illustrated here is a transverse opening 46 within which is disposed a cam rod 47 having a knob 48 and being biased outwardly by a spring 49, but retained for movements by a screw 50 which acts between spaced shoulders defined by a slot 51. Movement of the knob 48 inwardly elevates the ejector pin 44 and hence the die 13 to a position above its normal or stationary position. Thus the tool support 32 is vertically slidable with the tool retainer 27 in the bore 20, and is vertically slidable independently of the tool retainer 27 in the bore 31.

Where the lower tool 13 is an annular die, it is preferable that a slug passage be provided as indicated at 52 in each of the tool support 32, tool retainer 27 and annular cam 23.

To enable rotation of the annular cam 23 without interference from the ejector pin 44, there is provided an eccentric aperture 53 which typically is kidney-shaped.

In punching machines of this type, it is customary to employ upper and lower tools 12, 13 which do not produce a circular hole. To preclude angular rotation of the lower tool element 13 about the punching or vertical axis, there is provided a first keying means 54 secured to the housing section 19a and received in a slot 55 which extends vertically on the outside of the tool retainer 27. A second keying means 56 is secured to the tool retainer 27 and is received in a notch in the lower tool 13 for locating it angularly precisely. The tool support 32 is provided with a vertical slot 57 which provides a clearance around the second keying means 56 as shown in FIG. 3.

A separate rack guide 58 is secured to the housing section 19a, and encloses and guides the rack 35. The rack guide 58 is functionally a part of the frame 11. When the rack 35 is operated rapidly, particularly in the direction which restores the die 13 to its upper position, there is tendency for the die 13 to jump out of the pocket in which it rests. To preclude this possibility, there is provided a manually releasable tool keeper 59 carried by the tool retainer 27. The tool keeper 59 engages the upper edge of the lower tool 13 and holds it in position in the machine. The tool keeper structure includes a spring that imparts friction to it to restrict its ability to rotate, however, the tool keeper 59 is manually rotatable to facilitate ejection of the lower tool 13 by the ejector pin 44.

The housing 19 also supports a retractible stop member 60 shown in FIG. 3 which has a stop face 61 against which a workpiece may be initially disposed prior to clamping by the clamp means 18 of the positioning system 15. Once the workpiece 14 is so clamped, the stop member 60 may be manually depressed and thus retracted. Such structure 60 may employ a pneumatic or electric means connected at 62 for releasing such structure which rises to place the stop face 61 within the plane of the workpiece in response to a spring (not shown).

Figure 4:
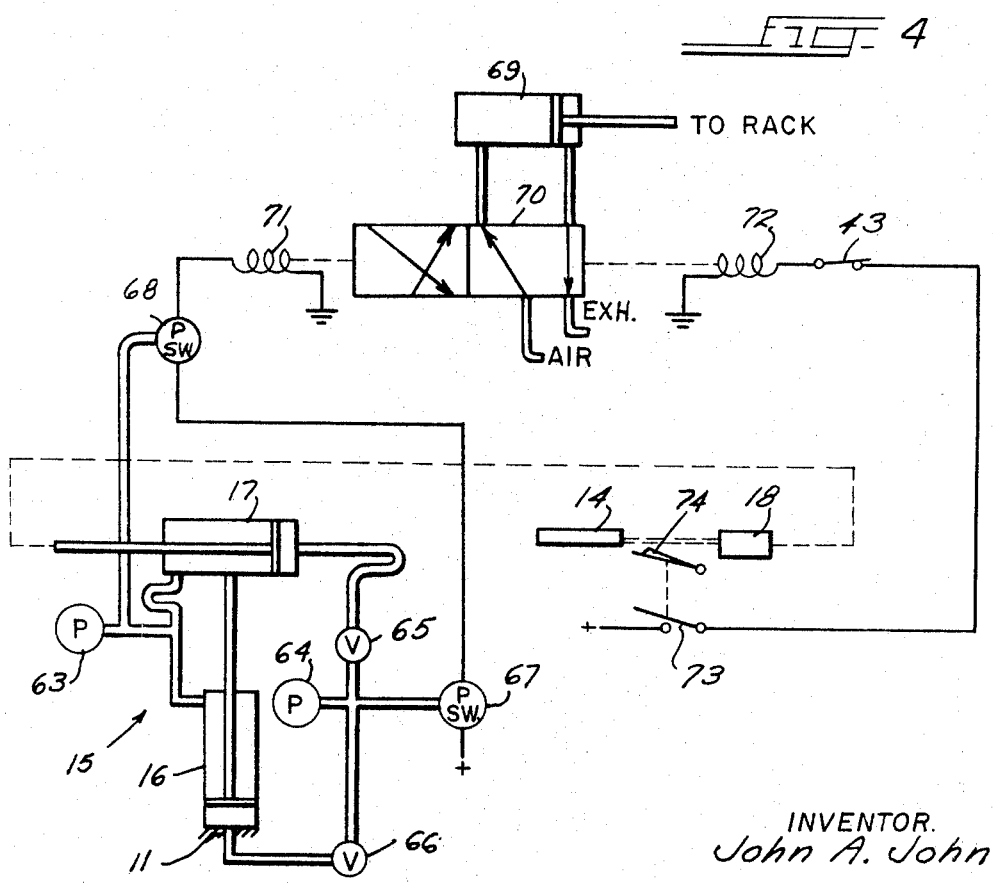
FIG. 4 is a schematic diagram of the system.

A simplified schematic diagram illustrating the principles of control of the tool support system is shown in FIG. 4. One side of each of the actuator means 16, 17 is continually pressurized by a pump 63 and the other side of the actuators are selectively pressurized from a second pump 64 by means of fluid pressure controlled by a pair of valves 65, 66. The pressure at the outlet of the pumps 63, 64 goes down when pressurized fluid from such pump is utilized to move the actuator means 16, 17. A pressure switch 67 is responsive to such pressure from one of the pumps 64 and a pressure switch 68 is responsive to the fluid pressure from the other of such pumps 63. The pressure switches 67 and 68 are closed whenever the pressure is at a normal maximum, and are open whenever the pressure drops, as is the case when workpiece movement is taking place.

The rack 35 is driven by an actuator 69, here comprising a fluid actuator. It is to be understood that other means carried by the frame for rotating the cam or wedge 23, or that other driving means to move the wedge or cam 23 may be employed. The actuator 69 in this embodiment is a pneumatic actuator under the control of a double detented 4-way pneumatic valve 70 of the electrically actuated type having a pair of solenoids 71 and 72. Solenoid 71 is connected through at least one of the pressure switches 67, 68 to a source of power, and solenoid 72 is connected through the switch 43 to a further switch 73 under the control of a yieldable bar 74 disposed in proximity to the lower tool 13. As shown in FIG. 1, the bar 74 is engaged by the clamp means 18 as such clamp means or portion approaches the lower tool 13 to close the first switch 73 which controls the actuator 69.

As best seen in FIG. 4, closing of the first switch 73 brings power to the coil 72 to shift the slide of the 4-way valve 70 to the right so as to bring air to the rod-end of the actuator 69 and to vent the other side. Such air pressure drives the actuator 69 in one direction and hence the rack 35, thereby effecting lowering of the lower tool 13. The movement of the positioner system 15 caused the second switch means 67, 68 to open before the switch 73 was closed, and such second switch means 67, 68 reclose as soon as the move has been completed and the line pressure restored. Upon the completion of the move, therefore, the second switch means 67 or 68 recloses the circuit to the solenoid 71, thereby shifting the slide of the 4-way valve to the position shown to effect movement of the rack in the opposite direction and hence restoration of the lower tool 13 to the normal position. The third switch 43, as explained above, opens when the die 13 has been lowered, thereby terminating control of the driving means by the first switch 73, even though it remains closed. Note that even though the switch 73 has reopened, the system does not attempt to raise the die 13 until the move has been completed.

Thus, this invention provides tool support means or a system by which the lower tool 13 is supported in a normal position for punching, such system or means being operative to lower the lower tool 13 temporarily, and to raise it to the normal position.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A punching machine comprising:
   (a) an upper reciprocably driven tool;
   (b) a lower normally stationary tool coactive therewith and having upper and lower positions;
   (c) a workpiece positioning system secured to the punching machine and having a portion movable in a collision path with respect to said lower tool in its upper position; and
   (d) means supporting said lower tool in a normal position for punching, said means being operative to lower said lower tool from its upper position to enable said portion of said workpiece positioning system to move through space occupied by said lower tool in its upper position, and said means being operative to raise said lower tool to said upper position.

2. A punching machine comprising:
   (a) an upper reciprocably driven tool;
   (b) a lower normally stationary tool coactive therewith;
   (c) a workpiece positioning system; and
   (d) a tool support system supporting said lower tool in a normal position for punching, said support system being responsive to the approach of a portion of said workpiece positioning system into the proximity of said lower tool to lower said lower tool temporarily, and being operative thereafter to raise it to said normal position.

3. A punching machine comprising:
   (a) an upper reciprocably driven tool;
   (b) a lower normally stationary tool coactive therewith;
   (c) workpiece positioning means including a workpiece clamp for engaging opposite sides of a workpiece, and shaped to project below the lower side thereof;
   (d) means supporting said lower tool support in a normal position for punching, and operative to lower said tool temporarily, and to raise it to said normal position, said means including an actuator to effect such lowering and raising;
   (e) a switch connected to control said actuator; and
   (f) a yieldable bar disposed to be engaged by said clamp as it nears said lower tool, and to operate said switch.

4. A punching machine comprising:
   (a) a frame;
   (b) an upper driven tool reciprocably carried on said frame;
   (c) a lower tool comprising an annular die coactive with said upper tool;
   (d) a vertically slidable tool retainer normally holding said lower tool in a stationary position for punching;
   (e) a movable wedge member acting between said frame and said tool retainer, said wedge being operative to lower said tool retainer and said lower tool to a retracted position, and thereafter to restore the normal position thereof; and
   (f) means defining a slug passage extending from said die through said tool retainer, through said wedge member, and through a portion of said frame.

5. A punching machine comprising:
   (a) a frame;
   (b) an upper driven tool reciprocably carried on said frame;
   (c) a lower tool coactive with said upper tool;
   (d) a vertically slidable annular tool retainer;
   (e) a tool support disposed within said retainer for vertical sliding movement both with said retainer and independent of said retainer, said tool support and said retainer jointly normally holding said lower tool in a stationary position for punching;
   (f) a vertically reciprocable tool ejector pin supported by said frame for acting on said tool support to raise it and said lower tool to a position above said stationary position; and
   (g) a movable wedge member acting between said frame and said tool retainer, said wedge being operative to lower said tool retainer, said tool support, and said lower tool to a non-operative position below said stationary position, and thereafter to restore them to said stationary position.

6. A punching machine comprising:
   (a) a frame;
   (b) an upper driven tool reciprocably carried on said frame;
   (c) a lower tool coactive with said upper tool;
   (d) a vertically slidable annular tool retainer;
   (e) a tool support disposed within said retainer for vertical sliding movement both with said retainer and independent of said retainer, said tool support and said retainer jointly normally holding said lower tool in a stationary position for punching;
   (f) a vertically reciprocable tool ejector pin supported by said frame for acting on said tool support to raise it and said lower tool to a position above said stationary position;
   (g) a rotatable cam supported by said frame and having cam surface means engageable with said tool retainer for lowering said tool retainer and said lower tool to a non-operative retracted position, and for restoring them to the normal position, said rotatable cam having an eccentric aperture; and
   (h) a vertically reciprocable tool ejector pin supported by said frame and extending through said eccentric aperture for acting on a lower surface of said tool support to raise it and said lower tool to a position above said stationary position.

7. A punching machine as claimed in claim 4, including spring means acting between said frame and said tool retainer and urging said retainer against said wedge member.

8. A punching machine as claimed in claim 4 wherein said tool retainer and said lower tool have cylindrical external surfaces, including first keying means acting between said frame and said tool retainer, and second keying means acting between said tool retainer and said lower tool, said first and second keying means precluding any angular movement of said lower tool.

9. A punching machine as claimed in claim 4, including a manually releasable tool keeper carried by said tool retainer in position to engage said lower tool for holding it in the punching machine as it is restored by said wedge member to its normal position.

10. A punching machine as claimed in claim 4 which includes a punching control circuit, the improvement comprising a switch connected in said circuit and responsive to the position of said tool retainer for disabling said circuit whenever said tool retainer is retracted from said stationary position.

11. A punching machine as claimed in claim 4, including:
   (a) driving means carried by said frame for moving said wedge member;
   (b) a workpiece positioning system supported by said frame;
   (c) a first switch disposed adjacent to said lower tool and responsive to the approach of a portion of said positioning system, and connected to operate said driving means to lower said tool retainer; and
   (d) a second switch responsive to the completion of the move by said positioning system, and connected to operate said driving means to elevate said tool retainer to its normal position.

12. A punching machine as claimed in claim 11, including a third switch connected in series with said first switch, and responsive to the retracted position of said tool retainer to terminate control of said driving means by said first switch.

References Cited

UNITED STATES PATENTS

| | | | |
|---|---|---|---|
| 1,082,669 | 12/1913 | Winkley | 83—623 X |
| 1,959,602 | 5/1934 | Stanbon | 83—563 |
| 3,266,352 | 8/1966 | Kuts | 83—623 X |

JAMES M. MEISTER, *Primary Examiner.*